(12) United States Patent
Bauder

(10) Patent No.: US 9,772,092 B2
(45) Date of Patent: Sep. 26, 2017

(54) LAMP ASSEMBLY AND METHOD FOR TORQUE-FREE ASSEMBLY OF THE LAMP ASSEMBLY

(71) Applicant: Hella KGaA Hueck & Co., Lippstadt (DE)

(72) Inventor: Alexander Bauder, Kirchlengern (DE)

(73) Assignee: Hella KGaA Hueck & Co., Lippstadt (DE)

( * ) Notice: Subject to any disclaimer, the term of this patent is extended or adjusted under 35 U.S.C. 154(b) by 146 days.

(21) Appl. No.: 14/883,182

(22) Filed: Oct. 14, 2015

(65) Prior Publication Data
US 2016/0138786 A1 May 19, 2016

(30) Foreign Application Priority Data
Nov. 14, 2014 (DE) ........................ 10 2014 116 684

(51) Int. Cl.
| | |
|---|---|
| *F21V 33/00* | (2006.01) |
| *F21V 17/16* | (2006.01) |
| *F16B 5/02* | (2006.01) |
| *F21S 8/10* | (2006.01) |
| *F21V 19/00* | (2006.01) |
| *F21V 29/70* | (2015.01) |
| *F21V 7/00* | (2006.01) |

(52) U.S. Cl.
CPC .......... *F21V 17/166* (2013.01); *F16B 5/0266* (2013.01); *F21S 48/1159* (2013.01); *F21S 48/1305* (2013.01); *F21S 48/321* (2013.01); *F21S 48/328* (2013.01); *F21V 7/00* (2013.01); *F21V 17/162* (2013.01); *F21V 19/0035* (2013.01); *F21V 29/70* (2015.01)

(58) Field of Classification Search
CPC .... F21S 48/1159; F21S 48/135; F21S 48/321; F21S 48/328; F21V 17/166; F21V 17/162; F21V 19/0035; F16B 5/0266
USPC ...................................................... 313/45–47
See application file for complete search history.

(56) References Cited

U.S. PATENT DOCUMENTS

| | | | | |
|---|---|---|---|---|
| 1,911,820 | A * | 5/1933 | Fitzgerald | F16B 5/0266 411/350 |
| 2007/0206369 | A1* | 9/2007 | Takeda | F21S 48/1109 361/820 |
| 2008/0087911 | A1* | 4/2008 | Stoyan | F21K 9/00 257/99 |
| 2010/0110680 | A1* | 5/2010 | Bianco | F21V 17/107 362/235 |
| 2011/0149586 | A1* | 6/2011 | Schug | F21S 48/1159 362/519 |

* cited by examiner

*Primary Examiner* — Alexander Garlen
(74) *Attorney, Agent, or Firm* — Husch Blackwell LLP

(57) ABSTRACT

A lamp assembly and to a method for assembling the lamp assembly with a heat sink, a base plate for holding at least one light source, and a reflector. A light that can be generated by the light source can be directed into this reflector and wherein the heat sink has a mounting surface on which the base plate and the reflector are arranged one on top of the other. A common mounting opening extends through the heat sink, the base plate, and the reflector, wherein a spring element and a tension element are arranged in this opening and wherein the heat sink, the base plate, and the reflector are clamped one on top of the other with a clamping force by means of the spring element. The clamping force is applied on the spring element by means of the tension element.

10 Claims, 2 Drawing Sheets

LAMP ASSEMBLY AND METHOD FOR TORQUE-FREE ASSEMBLY OF THE LAMP ASSEMBLY

CROSS REFERENCE

This application claims priority to German Application No. 10 2014 116684.1, filed Nov. 14, 2014, the entirety of which is hereby incorporated by reference.

FIELD OF TECHNOLOGY

The present invention relates to a lamp assembly with a heat sink, a base plate for holding at least one LED light source, and a reflector, wherein light that can be generated by the LED light source can be directed into the reflector, and wherein the heat sink has a mounting surface on which the base plate and the reflector are arranged one on top of the other.

BACKGROUND

DE 10 2012 202 933 A1 shows a lamp assembly with a heat sink, a base plate for holding at least one LED light source, and a reflector, wherein light that can be generated by the LED light source can be directed into the reflector. The heat sink has a mounting surface on which the base plate and the reflector are arranged one on top of the other. Threaded elements are used to create a connection of the reflector to the base plate and the heat sink. When the threaded elements are tightened, a torque is applied to the parts to be connected, which can lead to misalignment. In particular, when the base plate with the LED light sources is adjusted relative to the reflector, the adjusted position can be lost when the threaded elements are tightened. Therefore, a torque-free connection between the heat sink, the base plate, and the reflector is desirable.

SUMMARY OF THE INVENTION

The task of the invention is to overcome the disadvantages from the prior art by forming a lamp assembly with a heat sink, a base plate, and a reflector in which the base plate with the reflector is to be arranged with a torque-free connection on the heat sink. In particular, a connection of the reflector, base plate, and heat sink should prevent misalignment especially of LED light sources on the base plate relative to the reflector.

To achieve the task, it is proposed according to the invention that a common mounting opening extends through the heat sink, the base plate, and the reflector, wherein a spring element and a tension element are arranged in the opening, wherein the heat sink, the base plate, and the reflector are clamped one on top of the other with a clamping force by means of the spring element, and wherein the clamping force is applied onto the spring element by means of the tension element.

The invention advantageously uses the possibility of forming a common mounting opening through the heat sink, the base plate, and the reflector. Through the spring element and the tension element, no torque is generated between the reflector and the heat sink or the base plate for applying the clamping force, so that misalignment of the base plate with the LED light sources relative to the reflector is also prevented. The clamping force can be set by means of the tension element, wherein elongation of the spring element generates an essentially linear increase in force over a tensioning displacement of the spring element. If the clamping force reaches a desired value in that the spring element has been clamped accordingly, then the tension element can be fixed so that when the lamp assembly is in operation, the clamping force is maintained continuously via the spring element and the tension element.

The light source can be formed from an LED or from a laser or the light source can contain multiple LEDs. A design of the light source with a conventional light source, for example, with a thermal emitter or a gas discharge lamp, is also possible within the scope of the invention.

According to one advantageous embodiment of the lamp assembly, the mounting opening can have opposing opening areas so that a first opening area is, for example, in the heat sink and an opposing second opening area is in the reflector and the mounting opening extends between the two opening areas. The spring element can here sit, for example, in the first opening area and the tension element can sit in the opposing second opening area. If the spring element and the tension element are introduced into the respective opening areas, these can be connected to each other on the inside in the mounting opening, according to which the clamping force is applied onto the spring element by the tension element.

The spring element can be formed, for example, by a coil spring and the spring element can have a first end area with a collar with which the spring element sits in the opening area. In addition, the spring element, in particular, the coil spring, can have a second end area with a middle tab on which the tension element is attached.

The tension element can have a plate with which the tension element sits in the second opening area and wherein the tension element has a tension band that is guided around the middle tab of the spring element. In particular, the tension element can be designed in the form of a cable tie. If a loop is formed with the tension band around the middle tab, the end of the tension band can be guided back through the plate and the tension band can be tightened on the plate like a kind of cable tie. The pulled-in area of the tension band is here fixed in the plate and the spring element is clamped by pulling the tension band sufficiently far into the plate so the connected arrangement of the heat sink, the base plate, and the reflector is fixed for long-term use. If necessary, an end of the tension band projecting out from the plate can be cut off.

The tension band can be locked in the plate of the tension element at different band lengths, in particular, like a kind of cable tie, so that, for example, by means of a specified pulling-in displacement of the tension band into the plate, the required clamping force can be applied. The heat sink, base plate, and reflector are pressed together via the opening areas, in that the plate sits, for example, in the opening area of the reflector with a positive fit and the collar of the spring element sits in the opening area of the heat sink with a positive fit. To prevent lateral forces and tilting moments, the plate can sit, for example, in a floating arrangement in the opening area of the reflector. Thus, the plate can be automatically aligned with the center axis of the clamping force, without the tension band, for example, the cable tie, pulling the spring element into an inclined position. Consequently, the connection of the heat sink to the base plate and to the reflector is not only torque-free but also free from forces perpendicular to the guiding direction.

The invention is further directed toward a method for assembling a lamp assembly with a heat sink, a base plate for holding at least one LED light source, and a reflector, wherein light that can be generated by the LED light source can be directed into the reflector, wherein the heat sink has a mounting surface on which the base plate and the reflector are arranged one above the other, and wherein the method has at least the following steps: provision of the heat sink, base plate, and reflector in an arrangement one above the other and with a common mounting opening; insertion of a spring element and a tension element into the mounting opening and application of a clamping force by means of the tension element onto the spring element, so that the heat sink, base plate, and reflector are connected to each other with a torque-free connection.

In particular, the mounting opening can extend between two opening areas, wherein the spring element is inserted into a first opening area and the tension element is inserted into an opposing second opening area of the mounting opening. The spring element can comprise a collar by means of which the clamping force is applied, for example, onto the heat sink, and the tension element can have a plate that sits in a floating arrangement in the opening area of the mounting opening that extends in some sections through the reflector.

According to one advantageous construction of the method according to the invention, the tension element can have a tension band, wherein, for applying a clamping force by means of the tension element on the spring element, it is provided that the tension band is guided around a middle tab of the spring element while forming a loop and the tension band is then tightened like a kind of cable tie until the desired clamping force is achieved. The spring element is constructed, in particular, as a coil spring and has the collar on a first end and on the opposing second end, the coil spring has the middle tab. The tension band can be flexible like a kind of cable tie, so that this is guided around the middle tab of the spring element, in particular, by hand. Then the end of the tension band is introduced back through an opening in the plate of the tension element and the tension band can be pulled through the plate to a length that corresponds to a known clamping force. Thus, the clamping force can be set by means of a measurable length of the tension band section pulled through the plate. Alternatively, the spring element can also be formed by a clip that sits in the opening area of the mounting opening or the spring element is generally formed by a bending plate or by some other elongation element. Here it is important and especially advantageous that the spring element and also the tension element form a contact on a counterpart contact in the opening areas of the mounting opening that define a contact plane that runs normal to the clamping force applied via the spring element.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
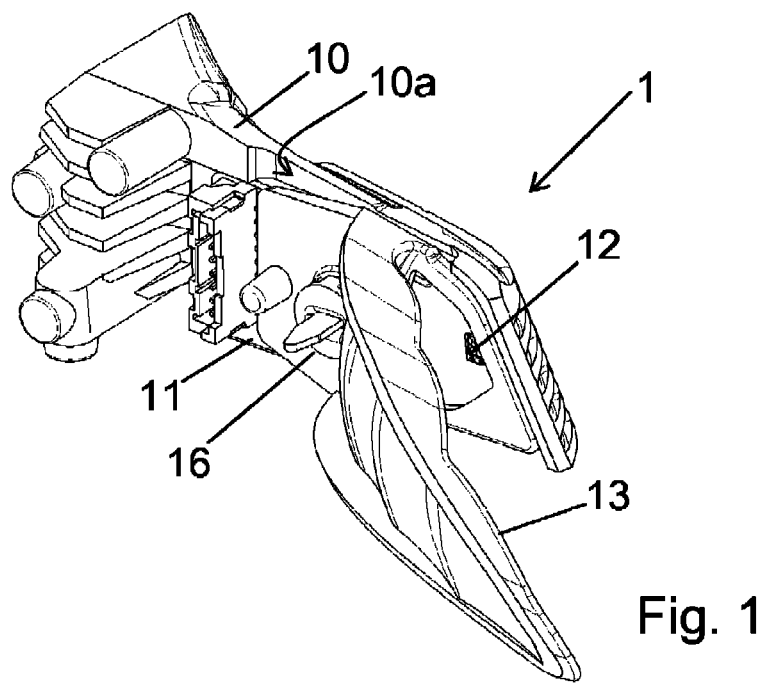
FIG. 1 is a perspective view of the lamp assembly.
Figure 2:
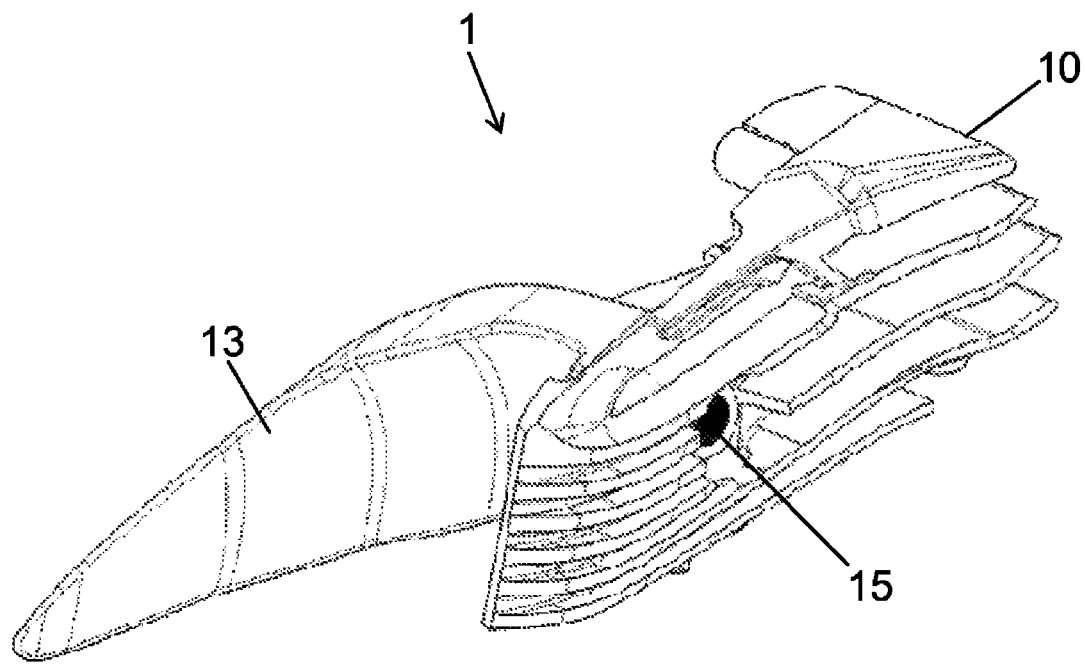
FIG. 2 is another perspective view of the lamp assembly.

FIGS. 1 and 2 show the lamp assembly 1 according to the invention from different perspectives. FIG. 1 shows the assembly 1 from the direction of the reflector 13 and FIG. 2 shows the assembly 1 from the direction of the heat sink 10.

The lamp assembly 1 comprises a heat sink 10, a base plate 11 for holding LED light sources 12, and a reflector 13. The lamp assembly 1 can be used for generating a main light function, for example, low beams, wherein the shown assembly 1 can also form only one part of a light pattern or the lamp assembly can be used for fulfilling an auxiliary light or signaling function. The lamp assembly 1 is designed to be held in the housing of a headlamp, wherein the assembly 1 can be mounted, for example, by means of the heat sink 10 on a corresponding mounting.

The heat sink 10 has, on a front side, a mounting surface 10a with an essentially flat design and a base plate 11 sits on the mounting surface 10a. The base plate 11 can be designed preferably as a printed circuit board and can simultaneously dissipate heat from the LED light source 12, so that heat generated during operation of the LED light source 12 can be dissipated through the base plate 11 into the heat sink 10. Consequently, the base plate 11 can contact the mounting surface 10a preferably with a planar contact. On the front side of the base plate 11 there is a reflector 13 and the reflector 13 extends in an arc shape over the light source 12 so that, when energized accordingly, light is directed into the reflector 13.

An arrangement made from a spring element 15 and a tension element 16 is used for mounting the components consisting of the heat sink 10, base plate 11, and reflector 13, wherein the tension element 16 is shown in FIG. 1 from the side of the reflector 13 and the spring element 15 is visible in FIG. 2 from the back side of the heat sink 10. The structure and function of the connecting means between the heat sink 10, base plate 11, and reflector 13 is described in more detail in connection with FIGS. 3 and 4 below.

Figure 3:
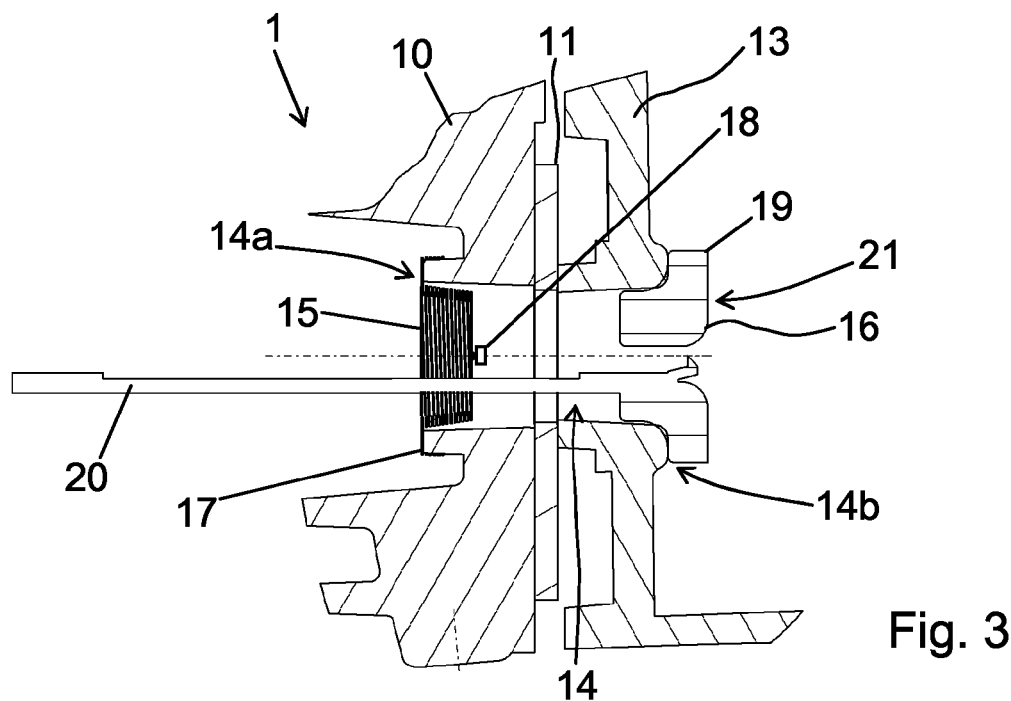
FIG. 3 is a cross-sectioned view of the lamp assembly with a tension element and a spring element in a non-connected arrangement.
Figure 4:
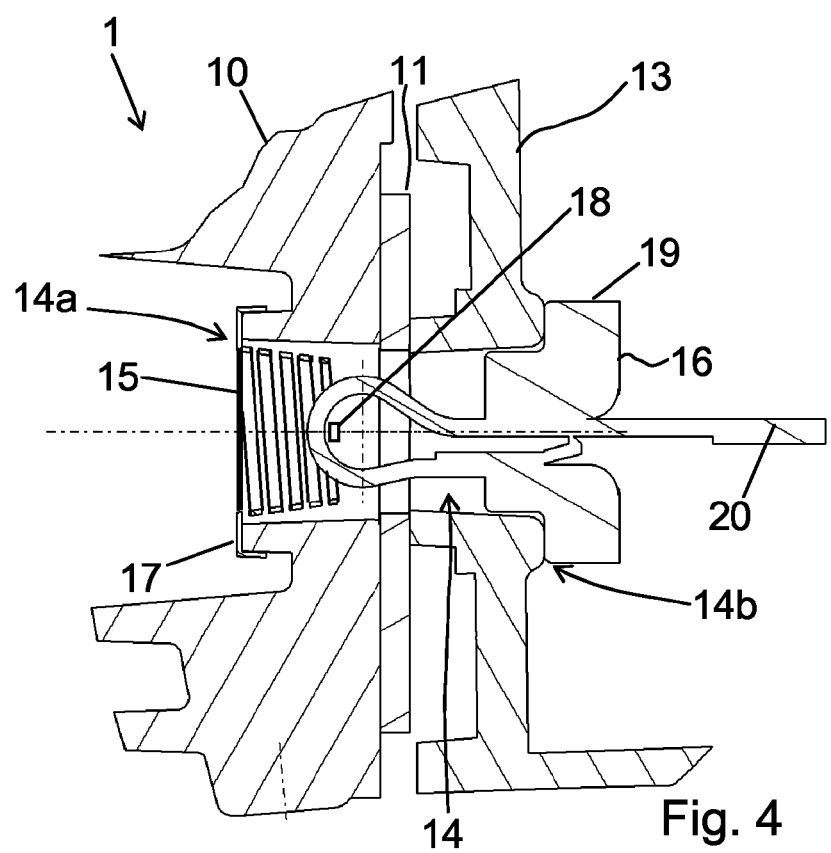
FIG. 4 is the cross-sectioned view according to FIG. 3 with a tension element that is brought into connection with a spring element and clamps the spring element with a clamping force.

FIGS. 3 and 4 shows a cross-sectional view through the lamp assembly 1 consisting of the heat sink 10, base plate 11, and reflector 13. A common mounting opening 14 extends through the heat sink 10, base plate 11, and reflector 13 and the mounting opening 14 runs between two opening areas 14a and 14b. A first opening area 14a is located in the heat sink 10 and an opposing second opening area 14b is located in the reflector 13. To create a connection between the heat sink 10, base plate 11, and reflector 13, a spring element 15 designed as a coil spring is inserted in the first opening area 14a, wherein the spring element 15 comprises a collar 17 that surrounds a correspondingly shaped inner part of the opening area 14 of the heat sink 10. On the opposing side, a tension element 16 that is designed like a kind of cable tie 21 is inserted in the second opening area 14b in the reflector 13. The tension element 16 comprises a plate 19 that sits in the second opening area 14b so that this sits in a floating arrangement over a molded shoulder on the plate 19 in a correspondingly shaped collar in the opening area 14b of the reflector 13. The tension element 16 further comprises a tension band 20 that extends outward from the plate 19 and the tension band 20 can be guided through another opening in the plate 19 and locked in this plate. Thus, the tension element 16 is designed essentially like a kind of cable tie.

To produce the connection between the heat sink 10, base plate 11, and reflector 13, the tension band 20 of the tension element 16 is brought into connection with the spring element 15, as shown in FIG. 4. For this purpose, the spring element 15 has a middle tab 18 that is located on the opposing end of the end of the spring element 15 on which the collar 17 is attached. If the tension band 20 is guided around the middle tab 18, the tension band 20 can then be guided through the plate 19 and locked in this plate. While forming a loop that is guided around the middle tab 18, the tension band 20 can now be drawn into the plate 19, which elongates the spring element 15. The elongation of the spring element 15 generates a clamping force between the heat sink 10, base plate 11, and reflector 13 and the clamping force can be set by means of the length of the tension band 20 that is pulled through the plate 19.

The shown connection between the heat sink 10, base plate 11, and reflector 13 distinguishes itself in that only an axial force is applied in the extension direction of the mounting opening 14. The connection is thus torque-free and free from transverse forces, in particular, due to the central arrangement of the middle tab 18, so the spring element 15 is not pulled into an inclined orientation. The floating contact of the plate 19 in the opening area 14b of the reflector 13 can also prevent transverse forces. Another advantage consists in that the clamping force can be set simply by the length of the tension band 20 that is pulled back through the plate 19 while forming a loop around the middle tab 18. The setting can thus be realized by hand or with a gripper while measuring the force or preferably while measuring the displacement.

In its execution, the invention does not relate solely to the preferred embodiment described above. On the contrary, a number of variants that use the solution as represented above are conceivable, even on designs that are fundamentally different. All of the characteristics and/or advantages, including design details, arrangements in space, and processing steps, resulting from the claims, the description, or the drawings can be essential for the invention on their own as well as in any combination with each other.

LIST OF REFERENCE SYMBOLS

1 Lamp assembly
10 Heat sink
10a Mounting surface
11 Base plate
12 Light source
13 Reflector
14 Mounting opening
14a First opening area
14b Second opening area
15 Spring element
16 Tension element
17 Collar
18 Middle tab
19 Plate
20 Tension band
21 Cable tie

The invention claimed is:

1. A lamp assembly comprising:
  a heat sink,
  a base plate for holding at least one light source, and
  a reflector,
  wherein light generated by the light source is directed into this reflector and
  wherein the heat sink has a mounting surface on which the base plate and the reflector are arranged one on top of the other,
  wherein a common mounting opening extends through the heat sink, the base plate, and the reflector,
  wherein a spring element and a tension element are arranged in this opening,
  wherein the heat sink, the base plate, and the reflector are clamped one on top of the other with a clamping force by means of the spring element, and
  wherein the clamping force is applied onto the spring element by means of the tension element.

2. The lamp assembly according to claim 1, wherein the mounting opening extends between a first opening area and an opposing second opening area, wherein the spring element sits in the first opening area and the tension element sits in the opposing second opening area.

3. The lamp assembly according to claim 2, wherein the spring element is formed by a coil spring and has a first end area with a collar with which the spring element sits in the opening area.

4. The lamp assembly according to claim 2 wherein the spring element has a second end area with a middle tab on which the tension element is attached.

5. The lamp assembly according to claim 4 wherein the tension element has a plate with which the tension element sits in the second opening area and wherein the tension element has a tension band that is guided around the middle tab of the spring element.

6. The lamp assembly according to claim 1 wherein the tension element is formed as a cable tie.

7. The lamp assembly according to claim 6 wherein the tension band (20) can be locked in the plate (19) of the tension element (16) at different band lengths like a kind of cable tie (21).

8. A method for assembling a lamp assembly with a heat sink, a base plate for holding at least one light source, and a reflector, wherein light that generated by the light source is directed into the reflector, wherein the heat sink has a mounting surface on which the base plate and the reflector are arranged one on top of the other, and the method including the steps of:
  providing the heat sink, the base plate, and the reflector in an arrangement one on top of the other and with a common mounting opening,
  inserting a spring element and a tension element in an opposing arrangement in the mounting opening, and
  applying a clamping force by means of the tension element on the spring element perpendicular to the mounting surface so that the heat sink, the base plate, and the reflector are connected to each other with a torque-free connection.

9. The method according to claim 8, wherein the mounting opening extends between two opening areas, wherein the spring element is inserted into a first opening area and wherein the tension element is inserted into an opposing second opening area.

10. The method according to claim 8 wherein the tension element has a tension band, wherein for applying a clamping force onto the spring element by means of the tension element it is provided that the tension band is guided around a middle tab of the spring element while forming a loop and the tension band is then tightened until the desired clamping force is achieved.

\* \* \* \* \*